J. W. AYLSWORTH.
METHOD OF MOLDING DUPLICATE SOUND RECORDS AND OTHER OBJECTS.
APPLICATION FILED MAY 1, 1909.
1,146,385.
Patented July 13, 1915.
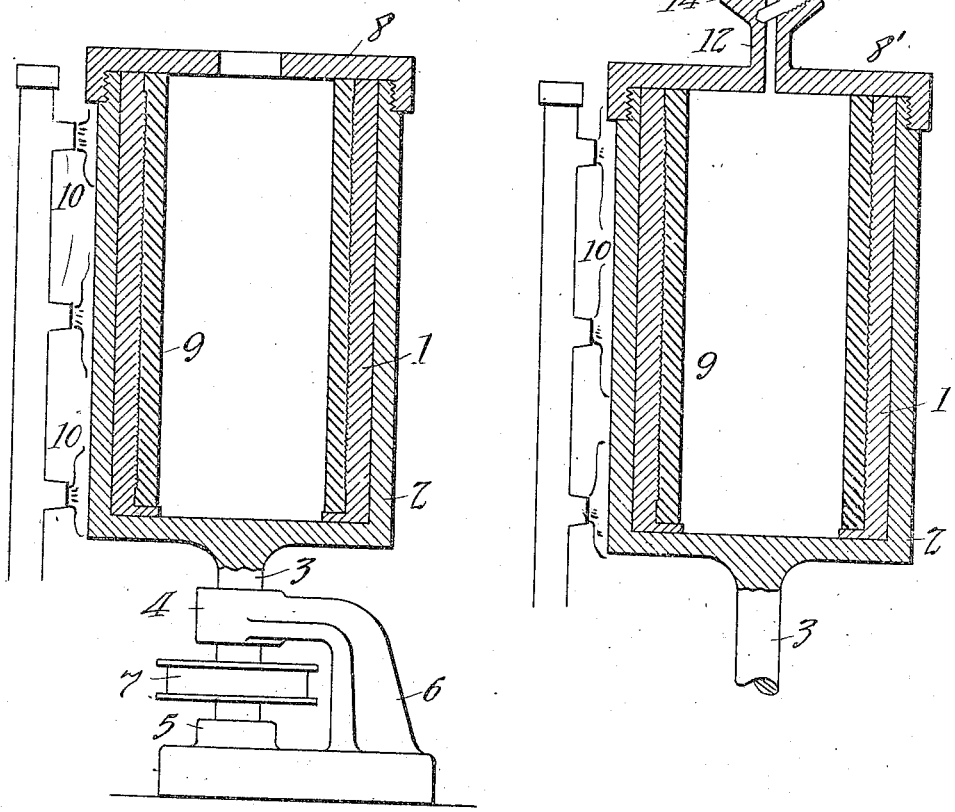

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

METHOD OF MOLDING DUPLICATE SOUND-RECORDS AND OTHER OBJECTS.

1,146,385.  Specification of Letters Patent.  Patented July 13, 1915.

Application filed May 1, 1909. Serial No. 493,416.

*To all whom it may concern:*

Be it known that I, JONAS W. AYLSWORTH, a citizen of the United States and a resident of East Orange, in the county of Essex and State of New Jersey, have made a certain new and useful Invention in Methods of Molding Duplicate Sound-Records and other Objects, of which the following is a description.

The object of my invention is to provide a method of molding sound records and other objects from substances which are not adapted to be molded by the well known methods.

The invention relates more particularly to a method of molding substances which in their final stage are non-plastic at such temperatures as may be used without injury to the substance or the matrix.

By means of the method herein described, I am enabled to mold sound records, both cylindrical and disk, from such bodies as are produced when albumenoids and caseins are combined with formaldehyde or other aldehydes or equivalent substances, and the various non-plastic condensation products of phenols, their homologues, their polymers and derivatives. These bodies have not heretofore been successfully molded into sound records, but are adapted to form excellent sound records if successfully molded, because of their physical qualities, which are especially useful for the purpose. Heretofore, sound records or other objects could only be molded from such substances by molding the material in the earlier plastic stages of its formation and completing the reaction of formation in the matrix, whereby a more or less porous and bubbly mass resulted, or by molding the substances in a plastic incomplete state and subsequently treating the article with formaldeyhde gas or liquid solution to harden the same. In both cases, the resulting product was not suitable for sound records because of air or gas bubbles and imperfections of surface which caused foreign noises when the record thus formed was reproduced, and otherwise impaired the quality of the sound record. In the present invention these defects are eliminated, and a sound record may be produced which is most refractory to the wearing action of the reproducing stylus, and which is not deteriorated by the effects of heat, moisture, handling and the action of the atmosphere thereon.

The invention may be practised in a number of ways. Attention is hereby directed to the accompanying drawings, forming part of this specification, and representing apparatus in which my process may be carried out.

Figure 1 is an elevation, partly in section, of a suitable rotatable mold in which a cylindrical sound record may be formed in the case in which the formaldehyde or equivalent agent is used in the liquid solution, and Fig. 2 is a similar view of apparatus adapted to the use of the formaldehyde or equivalent agent in the form of gas.

In carrying out the invention the ingredients such as albumenoids, caseins, gelatins, phenols and their polymers, etc., together with an aldehyde, such as formaldehyde or equivalent agent containing the methylene radical $CH_2$, may be mixed together with a suitable condensing or catalytic agent and allowed to react with the application of heat to form a liquid or plastic mass, which is then introduced into a matrix such as that shown in Fig. 1, in which the final reaction by which the non-plastic final product is formed, is caused to ensue, with application of heat, while the record is being molded. Or secondly, the body which it is intended to use as the basis of the substance, such as gelatin or casein mass, may be rendered plastic by water and heat, and then introduced into the matrix, or a body which is already plastic, as phenol, may be used, and the formaldehyde or equivalent agent with or without a catalytic or condensing agent may be subsequently introduced, either in fluid, that is, liquid or gaseous, form, into the matrix, and the matrix and its contents heated to hasten the completion of the condensation reaction and the equivalent polymerization or other hardening process, which results in the formation of the final non-plastic product. Or thirdly, a substance in liquid or plastic state may be introduced into the matrix together with a catalytic or other condensing agent, the substance so introduced being of such a character that polymerization or equivalent hardening action of the substance to a non-plastic permanent state will be induced in the matrix by heat. As an example of the last mentioned process, a condensation product of phenol with an aldehyde or other methylene-containing substance may be formed by mixing a phenol, as the well known phenol, carbolic acid, $C_6H_5OH$, with an aldehyde, as formaldehyde, $CH_2O$, in equal molecular proportions and combined by heat and pressure, without the addition, however, of a catalytic or condensing agent. The product thus obtained should, to obtain the best results, be evaporated to remove excess of formaldehyde and water at a temperature not exceeding 280 degrees F., and the product obtained is soluble and plastic or may be rendered plastic by heat, and this is combined with a condensing or catalytic agent and a small quantity of polymerized aldehyde or other methylene-containing substance, such as paraform aldehyde, both preferably in anhydrous condition, and properly mixed. Such a condensing agent may be either an acid or a basic substance. I prefer, however, to use small quantities of acid radicals or substances which will readily yield a free acid radical, such as pinene hydrochlorid, sublimed aluminium chlorid, stannic chlorid, etc, because of their rapid action. This condensing agent may be added to the mass at a relatively low temperature as by dissolving the mass in a volatile solvent in cases where the mass does not fuse at low enough temperature, and then adding the condensing agent and paraform aldehyde, whereupon the product may be poured into the matrix and subjected to subsequent heat treatment while the record is being formed.

In the first and third methods referred to above, a preliminary reaction is caused between the different ingredients before the same are introduced into the mold, the final reaction only taking place in the mold during the formation of the record by the molding process, whereas in the second of the three methods mentioned, the entire reaction between the ingredients takes place in the mold during the formation of the record. In all of these specific methods the final product is formed *in situ* in the mold in which the record or other object cast is formed by a centrifugal action, the process used being that commonly known as spinning. By this method the deleterious effects due to porosity because of the setting or hardening or changing from the plastic to the non-plastic state while the mass is evolving gases, is prevented by the pressure exerted on the mass by the centrifugal action induced by the relatively high speeds at which the matrix is rotated. The force induced by this centrifugal action counteracts the tension of dissociation in the mass being molded so that the formation of gas is prevented or retarded and minimized at the temperature necessary to rapidly perform the reaction.

Referring to the drawings, the mold 1 may be inserted within the rotatable container 2, which is integral with or secured to the spindle 3, which is adapted to rotate within the bearings 4 and 5 of the casting 6. The mold may, of course, be rotated in either a vertical or a horizontal position, but I prefer to use the vertical method of spinning the mold by centrifugal action, because of the high speeds which may readily be secured by this method. The spindle 3 may be rotated by means of the belt wheel 7 secured to the spindle 3, over which a belt driven from any convenient source of power is adapted to be placed, or the spindle 3 may be rotated by an individual drive, as by the direct connection of some prime mover thereto, as is disclosed in application of Aylsworth and Aiken No. 495,301, filed May 11, 1909, upon which Patent No. 1,041,948 has been granted. In the case in which the formaldehyde or other aldehyde or methylene-containing substance employed is introduced in a liquid solution, the apparatus shown in Fig. 1 may be used. Here, the material of an amount sufficient to form the record is introduced within the mold 1 and the cap 8 secured upon the container 2. The record 9 is then formed upon the bore of the mold 1 by centrifugal action, the spindle 3 being rotated at a high speed. During the formation of the record, the container 2, the mold 1 and the record 9 in process of forming, are kept heated by any convenient means, as the burners 10. During this operation the final reaction between the ingredients of the composition ensues, changing the same into a non-plastic body, which, as in the case of the resinized phenol condensation products, may also be insoluble in all ordinary solvents except boiling concentrated sulphuric acid, and also infusible. Less time is consumed in the molding operation with the use of high temperatures during the final reaction, and also the greater will be the tendency to the evolution of gases, necessitating an increase of pressure to counteract the same as the temperatures are raised to lessen the time factor. Good results are obtained with the use of temperatures above 320 degrees F. in the case of the resinized phenol condensation products.

When the formaldehyde or equivalent agent is introduced into the matrix in the form of gas, it is necessary that the matrix be closed after the introduction of the same. This may be carried out by means such as that shown in Fig. 2, in which the cap 8' is formed with a passageway 11 for the gas in the boss 12, and with a valve 13 for closing the same. The boss 12 may be formed with a counterweighted portion 14 to counterbalance the valve 13 during the rotation of the same.

As stated, excellent results have been obtained in my process with the use of both acid and basic substances as condensing agents. Small percentages of such substances as sodium hydroxid, lithium hydroxid, metallic oxids, and acid radicals may be used successfully.

When gelatins or other albumenoids are used, the substance may be soaked in cold water until it swells, when the excess of water is removed. The swelled gelatin is then heated until it melts and is poured hot into the mold and the aldehyde or methylene-containing substance added. In the case of formaldehyde solution, the proportions of the latter may be varied between five and twenty per cent. of 40% solution of formaldehyde. The temperature of the mold is maintained in the case of such ingredients at about 212 degrees F. during the hardening operation.

During the various reactions of the ingredients in the processes described, water is evolved and the reaction may be hastened in the case of the closed mold by absorbing the water vapors as they are given off. This may be done by connecting the mold with a suitable chamber in which a water absorbing substance is contained. Such substances as quick lime, zinc chlorid, phosphoric anhydrids or anhydrous copper sulfates may be used for this purpose.

In the case of the third specific method of combining the ingredients described above, the condensing agent may be added to a solution cont ining the initial or intermediate reaction product of the ingredients, which has been formed without the aid of a catalytic agent, or this intermediate product may be placed directly in the mold without the aid of a solution and the condensing agent added to the melted substance in the mold. Where the condensing agent is added to the ingredients dissolved in a volatile solvent as described, I have found good results to accrue from also adding more aldehyde to the solution, preferably in the form of paraform aldehyde or other solid aldehyde. I have found excellent results to accrue from the use of hydrochloric acid vapor or gas as a catalitic agent.

The present invention relates specifically to the novel method of producing pressure by which the dissociation gases which tend to be formed during the reaction are counteracted. The pressure caused by the centrifugal force due to the rotation of the mold, may, if desired, be augmented by the use of further pressure, and such a method I have claimed in an application filed on even date herewith, Serial No. 493,258.

The process has so far been described in connection with the molding of cylindrical sound records. It is, however, obvious that it is also applicable to the formation of other symmetrical objects of such materials in which it is desirable that the vaporization of the mass which would otherwise ensue during the reaction should be counteracted. Also, the method may be used in the formation of disk sound records by the use of a rotating mold such as that described and claimed in my application No. 493,052, filed April 29, 1909, in which the molds for the disk records are secured to the sides of an eight-sided or other poly-sided chamber, which is rotated about its axis, throwing the liquid or plastic material into the various molds, the material being measured and only sufficient quantity used in the process. Of course, it is also obvious that other objects besides disk sound records might easily be manufactured in the same manner.

Having now described my invention, what I claim and desire to protect by Letters Patent is as follows:

1. The method of molding sound records and other objects of substances non-plastic in their final condition, consisting in heating in a revoluble mold a fluid mass comprising a methylene containing substance and a substance which reacts with said methylene containing substance upon application of heat to form a substance which in its final stage is non-plastic at such temperatures as may be employed without injury to the substance or mold, and at the same time revolving the mold at a high rate of speed to spread the mass uniformly over the mold surface and also to counteract the tension of dissociation in the mass during its reaction, and continuing the operation until the final non-plastic cast is formed, substantially as described.

2. The method of molding sound records and other objects of substances non-plastic in their final condition, consisting in introducing into a suitable rotatable mold a substance which reacts with formaldehyde on application of heat to form a substance which in its final stage is non-plastic at such temperatures as may be employed without injury to the substance or mold, and a sufficient amount of fluid formaldehyde to cause the reaction, applying heat, causing the final reaction between the ingredients to ensue in the mold, and at the same time revolving the mold at a high rate of speed to spread the substance uniformly over the mold surface, and also to counteract the tension of dissociation in the substance during its reaction, and continuing the operation until the final non-plastic cast is formed, substantially as described.

3. The method of molding sound records and other objects of substances non-plastic in their final condition, consisting in introducing into a suitable rotatable mold a substance which reacts with a substance containing the methylene radical upon application of heat to form a substance which in its final stage is non-plastic at such temperatures as may be employed without injury to the substance or mold, and a sufficient amount of fluid methylene-containing substance to cause the reaction, applying heat, causing the final reaction between the ingredients to ensue in the mold and at the same time revolving the mold at a high rate of speed to spread the substance uniformly over the mold surface and also to counteract the tension of dissociation in the substance during its reaction, and continuing the operation until the final non-plastic cast is formed, substantially as described.

4. The method of molding sound records and other objects of substances non-plastic in their final condition, consisting in rendering plastic and introducing within a suitable rotatable mold a substance which reacts with an aldehyde on application of heat to form a substance which in its final stage is non-plastic at such temperatures as may be employed without injury to the substance or mold, introducing into the mold and substance a sufficient amount of a fluid aldehyde to cause the reaction, applying heat sufficient to cause the entire reaction to ensue in the mold and at the same time revolving the mold at a high rate of speed to spread the substance uniformly over the mold surface, and also to counteract the tension of dissociation in the substance during its reaction by centrifugal force, and continuing the operation until the final non-plastic cast is formed, substantially as described.

5. The method of molding sound records and other objects of substances non-plastic in their final condition, consisting in rendering plastic and introducing within a suitable rotatable mold a substance which reacts with a methylene-containing substance on application of heat to form a substance which in its final stage is non-plastic at such temperatures as may be employed without injury to the substance or mold, introducing into the mold and substance a sufficient amount of a fluid methylene-containing substance to cause the reaction, applying heat sufficient to cause the entire reaction to ensue in the mold and at the same time revolving the mold at a high rate of speed to spread the substance uniformly over the mold surface and also to counteract the tension of dissociation in the substance during its reaction by centrifugal force, and continuing the operation until the final non-plastic cast is formed, substantially as described.

6. The method of molding sound records and other objects of substances non-plastic in their final condition, consisting in rendering plastic and introducing within a suitable rotatable mold a substance which reacts with an aldehyde on application of heat to form a substance which in its final stage is non-plastic at such temperatures as may be employed without injury to the substance or mold, introducing into the mold and substance a sufficient amount of a fluid aldehyde and a condensing agent to cause the reaction, applying heat sufficient to cause the entire reaction to ensue in the mold and at the same time revolving the mold at a high rate of speed to spread the substance uniformly over the mold surface, and also to counteract the tension of dissociation in the substance during its reaction by centrifugal force, and continuing the operation until the final non-plastic cast is formed, substantially as described.

7. The method of molding sound records and other objects of substances non-plastic in their final condition, consisting in applying heat to a phenol, formaldehyde, and a condensing agent in a suitable rotatable mold sufficient to cause a reaction to transform the substances into a hard non-plastic substance and at the same time revolving the mold at a high rate of speed to spread the substance uniformly over the mold surface, and also to counteract the tension of dissociation in the substance during its reaction by centrifugal force, and continuing the operation until the final non-plastic cast is formed, substantially as described.

This specification signed and witnessed this 28th day of April 1909.

JONAS W. AYLSWORTH.

Witnesses:
 DYER SMITH,
 JOHN M. CANFIELD.